(12) United States Patent
Gaikwad et al.

(10) Patent No.: US 7,586,769 B2
(45) Date of Patent: Sep. 8, 2009

(54) POWER CONVERTERS HAVING BALANCED POWER RAIL CURRENTS

(75) Inventors: Khanderao Madav Gaikwad, Manila (PH); Palanivel Selvaraju, Manila (PH); Wilson Palaypayon, Laguna (PH)

(73) Assignee: Astec International Limited, Kwun Tong, Kowloon (HK)

( * ) Notice: Subject to any disclaimer, the term of this patent is extended or adjusted under 35 U.S.C. 154(b) by 132 days.

(21) Appl. No.: 11/433,836

(22) Filed: May 12, 2006

(65) Prior Publication Data

US 2007/0262752 A1 Nov. 15, 2007

(51) Int. Cl.
*H02M 7/757* (2006.01)
*H02M 5/42* (2006.01)

(52) U.S. Cl. .......................... 363/81; 363/89

(58) Field of Classification Search ................. 323/207, 323/222, 266, 283, 284, 285, 268, 271; 363/89, 363/124, 126, 70, 59, 60, 81
See application file for complete search history.

(56) References Cited

U.S. PATENT DOCUMENTS

| | | | |
|---|---|---|---|
| 4,384,321 A * | 5/1983 | Rippel | 363/124 |
| 5,428,523 A * | 6/1995 | McDonnal | 363/71 |
| 5,479,087 A * | 12/1995 | Wright | 323/267 |
| 6,084,790 A | 7/2000 | Wong | |
| 6,088,250 A * | 7/2000 | Siri | 363/97 |
| 6,344,985 B1 * | 2/2002 | Akerson | 363/65 |
| 6,445,599 B1 * | 9/2002 | Nguyen | 363/25 |
| 6,731,524 B2 * | 5/2004 | Elek et al. | 363/70 |
| 7,009,852 B2 * | 3/2006 | Ying et al. | 363/17 |
| 2002/0097004 A1 * | 7/2002 | Chiang et al. | 315/224 |
| 2003/0095421 A1 * | 5/2003 | Kadatskyy et al. | 363/65 |
| 2003/0137197 A1 * | 7/2003 | Raddi et al. | 307/66 |
| 2005/0105305 A1 * | 5/2005 | Sawada et al. | 363/34 |
| 2006/0132061 A1 * | 6/2006 | McCormick et al. | 315/291 |
| 2006/0209580 A1 * | 9/2006 | Itakura et al. | 363/65 |
| 2006/0274468 A1 * | 12/2006 | Phadke | 361/93.1 |

* cited by examiner

*Primary Examiner*—Edward Tso
*Assistant Examiner*—M'Baye Diao
(74) *Attorney, Agent, or Firm*—Harness, Dickey & Pierce, P.L.C.

(57) ABSTRACT

A power factor correction (PFC) circuit includes a coupled split boost choke having at least two windings, at least two boost diodes and at least two power rails. Each power rail includes one of the windings and one of the boost diodes. The PFC circuit further includes a current balancing circuit coupled between the power rails for substantially balancing currents in such power rails.

26 Claims, 6 Drawing Sheets

US 7,586,769 B2

POWER CONVERTERS HAVING BALANCED POWER RAIL CURRENTS

FIELD

The present disclosure relates to power factor correction circuits using split boost chokes, and power converters employing such power factor correction circuits.

BACKGROUND

The statements in this section merely provide background information related to the present disclosure and may not constitute prior art.

Meeting the present demands of increased power density and higher efficiency can be difficult in power converters having high output requirements. Various techniques have been developed in an attempt to satisfy these two demands. Such techniques include using multiple circuit elements such as multiple power switches, diodes, and chokes for better thermal management and higher efficiency.

FIG. 1 illustrates a boost converter 100 including some of the techniques described above. The boost converter 100 includes an alternating current (AC) power source 101, output terminals 102, 103, an output capacitor C2, power switches Q1 and Q2, boost diodes D6 and D7 and boost chokes L1, L2 and L3. The boost choke L3 is a coupled split boost choke having windings L31 and L32. The winding L31 and the boost diode D6 form a first power rail 104 and the winding L32 and the boost diode D7 form a second power rail 106. Also shown in FIG. 1 is a load R3 connected to the output terminals 102, 103. The load R3 can be, for example, a power converter requiring a PFC front end circuit.

Generally, during operation of the boost converter 100, energy is stored in the boost chokes L1, L2 and L3 when the power switches Q1 and Q2 are closed. When the power switches Q1 and Q2 are opened, the boost diodes D6 and D7 become forward biased and the energy stored in the boost chokes L1, L2 and L3 flows through the power rails 104 and 106 to the output terminal 102.

Using a coupled split boost choke, such as the coupled split boost choke L3, is one known technique to balance the currents flowing in the power rails 104 and 106. As recognized by the inventors, however, the currents flowing in the power rails 104 and 106 can remain unbalanced even though windings L31 and L32 are coupled. Such unbalanced currents can be caused by various factors including differences between the forward voltage drops of the boost diodes D6 and D7, the leakage inductance between the split choke windings L31 and L32, the trace inductance between the anode of the boost diode D6 and the winding L31, the trace inductance between the anode of the boost diode D7 and the winding L32, the branch inductance between the windings L31 and L32 and the power switches Q1 and Q2, and/or mismatches between the power switches Q1 and Q2 with respect to output capacitance, gate voltage, threshold voltage and/or gate drivers, and possibly other factors.

As a result of the current flow imbalance, the boost diodes D6 and D7 and the power switches Q1 and Q2 are typically overrated by about 130% to 150%. However, failures during operation of the boost converter 100 can still be expected even if the boost diodes D6 and D7 and the power switches Q1 and Q2 are overrated. For example, the boost converter 100 could fail during step load or input line transient conditions. Furthermore, the thermal performance of the power rails 104 and 106 can be unstable in the absence of overrated and/or expensive heat sinks.

SUMMARY

According to one aspect of the present disclosure, a power factor correction (PFC) circuit for a power converter includes a split boost choke having at least two windings, at least two boost diodes, and at least two power rails. Each power rail includes one of the windings and one of the boost diodes. The PFC circuit further includes a current balancing circuit coupled between the power rails.

According to another aspect of the present disclosure, a power converter includes a coupled split boost choke having at least three windings, at least three boost diodes, and at least three power rails. Each power rail includes one of the windings and one of the boost diodes. The power converter further includes at least two current balancing circuits. Each current balancing circuit is coupled between the two power rails for substantially balancing currents in the power rails when the power converter is delivering power to an output.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the scope of this disclosure nor its potential applications.

According to one aspect of the present disclosure, a power factor correction (PFC) circuit for a power converter includes a split boost choke having at least two windings, at least two boost diodes, and at least two power rails. Each power rail includes one of the windings and one of the boost diodes. The PFC circuit further includes a current balancing circuit coupled between the power rails.

Figure 1:
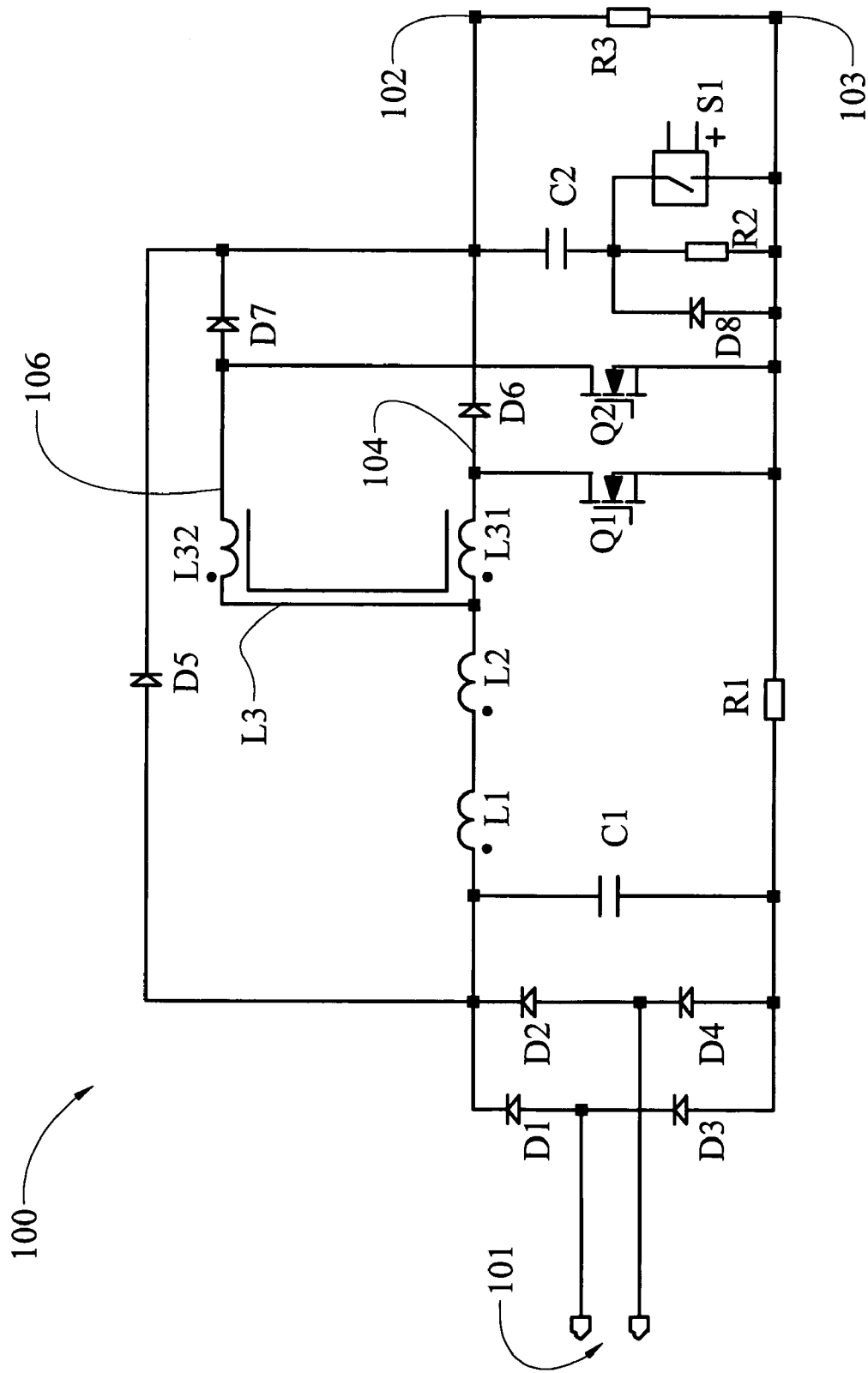
FIG. 1 is a circuit diagram of a boost converter having a coupled split boost choke according to the prior art.

One embodiment of a boost converter 200 incorporating this aspect of the present disclosure will now be described with reference to FIG. 2. Similar to the boost converter 100 of FIG. 1, the boost converter 200 shown in FIG. 2 includes the power switches Q1 and Q2, the boost diodes D6 and D7 and the boost chokes L1, L2 and L3. The boost diodes D6 and D7 are connected to the windings L31 and L32 to form the power rails 104 and 106. In addition, the boost converter 200 includes a current balancing circuit 108 for balancing currents flowing in the power rails 104 and 106.

Figure 2:
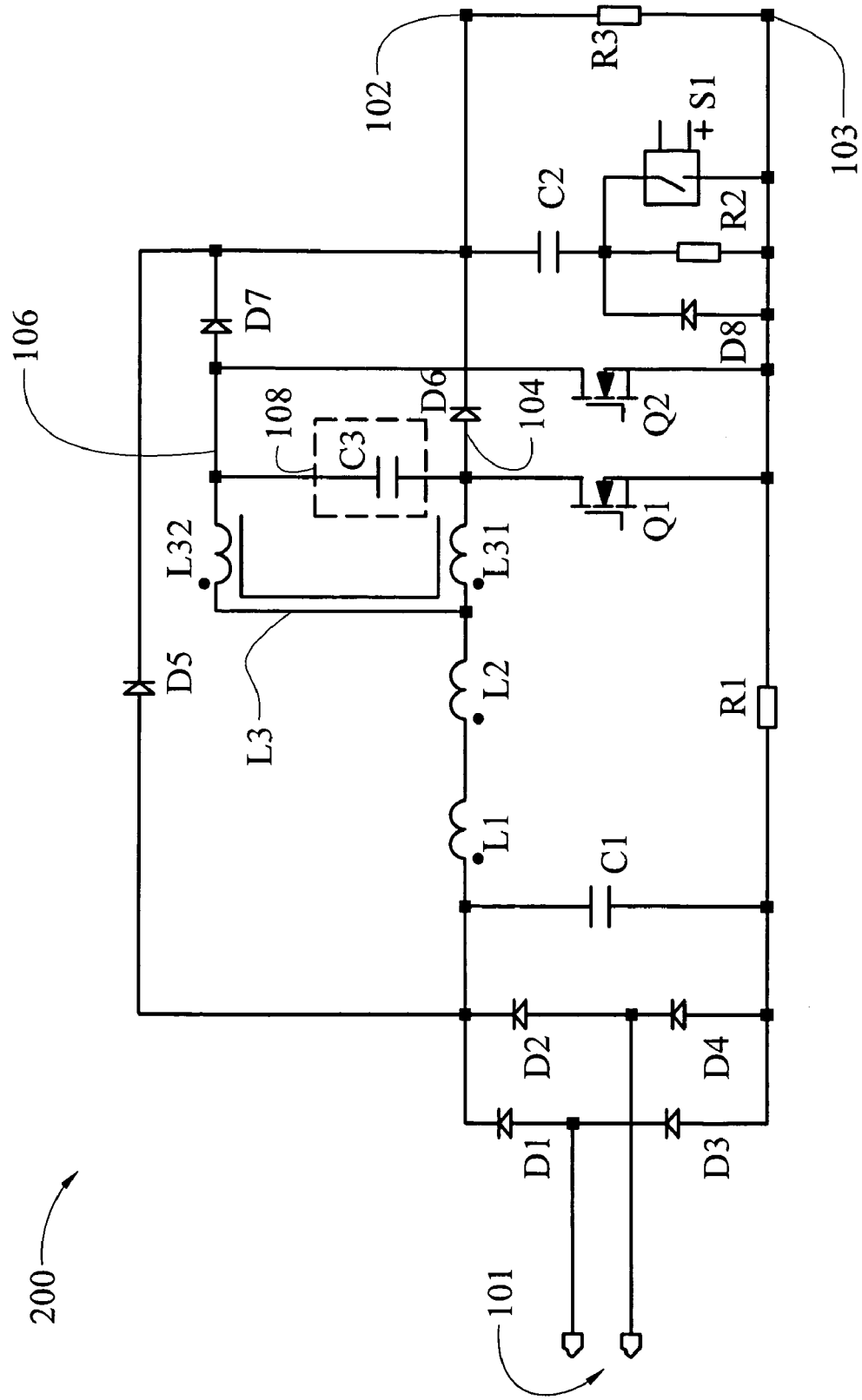
FIG. 2 is a circuit diagram of a boost converter having a current balancing circuit according to one embodiment of the present disclosure.

In the embodiment of FIG. 2, the current balancing circuit 108 includes a capacitor C3. In another embodiment described below, a current balancing circuit includes a capacitor in series with a resistor. It should be understood, however, that additional and/or other circuit components can be employed in the current balancing circuit without departing from the scope of the present disclosure.

Figure 3:
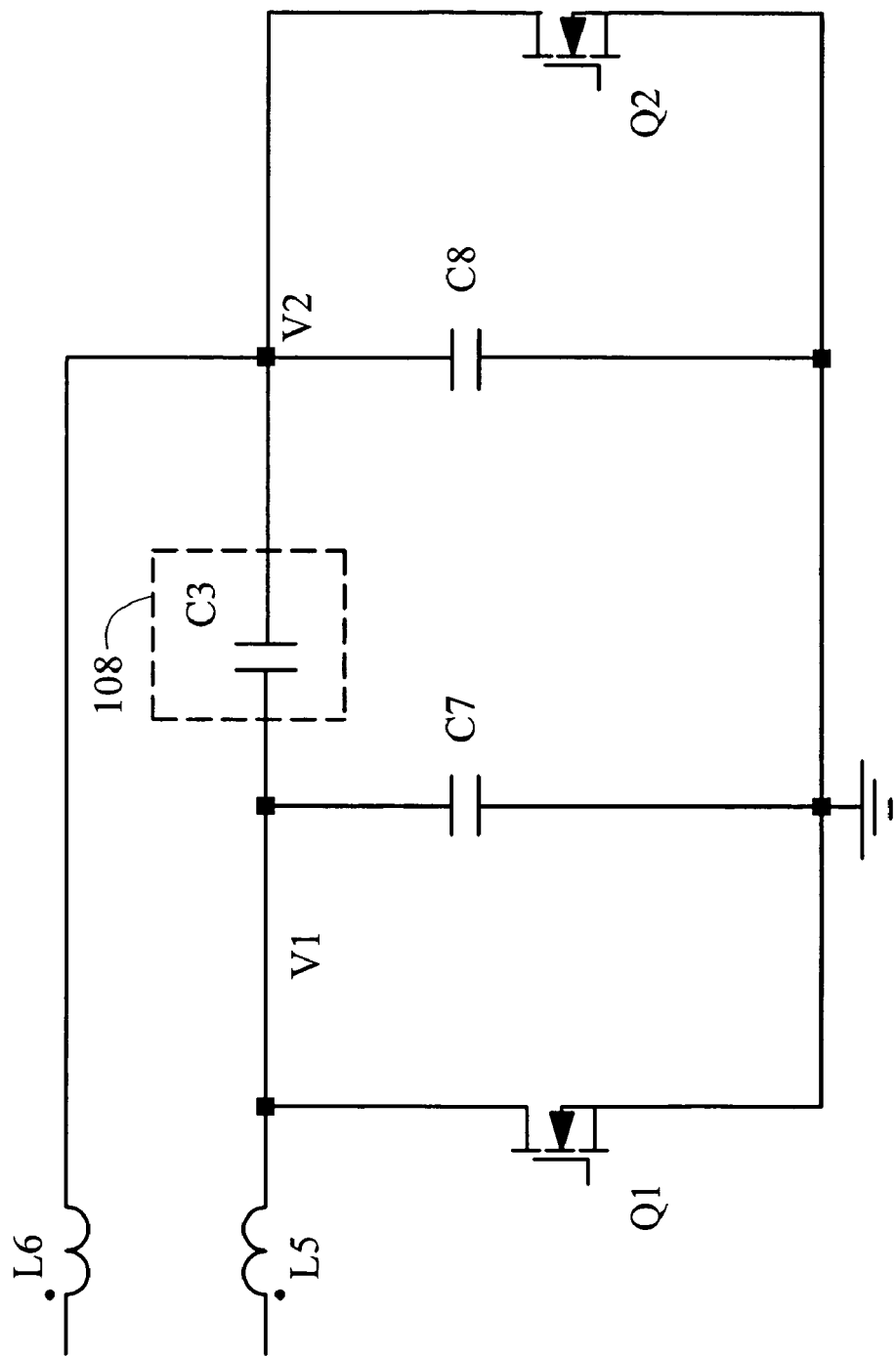
FIG. 3 is an equivalent circuit diagram for the boost converter of FIG. 2.

Referring now to FIG. 3, which is an equivalent circuit for the boost converter 200 of FIG. 2, the power switches Q1 and Q2 include output capacitors C7 and C8, respectively. When the power switches Q1 and Q2 are opened, a drain-to-source voltage V1 of the power switch Q1, and a drain-to-source voltage V2 of the power switch Q2, begin to increase. However, due to possible mismatches between the capacitors C7 and C8 and between the gate drivers (not shown) for each power switch Q1 and Q2, the voltages V1 and V2 may not increase (or decrease) at the same time or at the same rate. As a result, a voltage difference between voltages V1 and V2 could develop and cause a current imbalance in the power rails 104 and 106 if the current balancing circuit 108 were not employed. The current balancing circuit 108 substantially prevents this current imbalance by maintaining the voltages V1 and V2 substantially the same. For example, if the voltage V1 begins to increase above the voltage V2, the capacitor C3 will begin to charge and substantially balance the voltages V1 and V2.

Referring again to FIG. 2, the current balancing circuit 108 can also substantially balance the voltages across the windings L31 and L32. For example, in the situation where the voltage across the winding L31 is greater than the voltage across the winding L32, the capacitor C3 will begin to charge and substantially balance the voltages of the windings L31 and L32.

In addition, the current balancing circuit 108 can also substantially balance voltages across leakage inductances of the windings L31 and L32. In FIG. 3, windings L5 and L6 represent the leakage inductances of the windings L31 and L32, respectively. If there is a difference in the voltages across the windings L5 and L6, the capacitor C3 can charge to substantially balance the voltages across the windings L5 and L6. It should be noted that substantially balancing the voltages across the windings L5 and L6 allows magnetic flux across the windings L31 and L32 to be substantially balanced when the power rails 104 and 106 are delivering power to the output terminal 102.

Substantially balancing the voltages V1 and V2, the voltages across the windings L31 and L32 and the voltages across the leakage inductances L5 and L6 causes the boost diodes D6 and D7 to become forward biased at substantially the same time. Forward-biasing the boost diodes D6 and D7 at the same time can force equal current sharing between the windings L31 and L32, the boost diodes D6 and D7 and accordingly the power rails 104 and 106. Further, it should be noted that forcing equal currents in the power rails 104 and 106 can also force equal current sharing (and thus equal power dissipation) between the power switches Q1 and Q2.

The current balancing circuit 108 can substantially balance the currents flowing in the power rails 104 and 106 during start-up, steady state, step change in line, and fault conditions as well as missing AC cycle conditions. Additionally, the current balancing circuit 108 can lower reverse recovery current in the boost diodes D6 and D7. Furthermore, since the currents flowing in the power rails 104 and 106 are substantially balanced, low cost and low rated power switches and boost diodes can be used.

The capacitance of the capacitor C3 can depend on the switching frequencies of the power switches Q1 and Q2. For example, for switching frequencies ranging from 75 kHz to 100 kHz, the capacitance of the capacitor C3 can range between 0.1 µF to 0.22 µF. It should be understood, however, that other suitable capacitances and switching frequencies can be used without departing from the scope of this disclosure.

Figure 4:
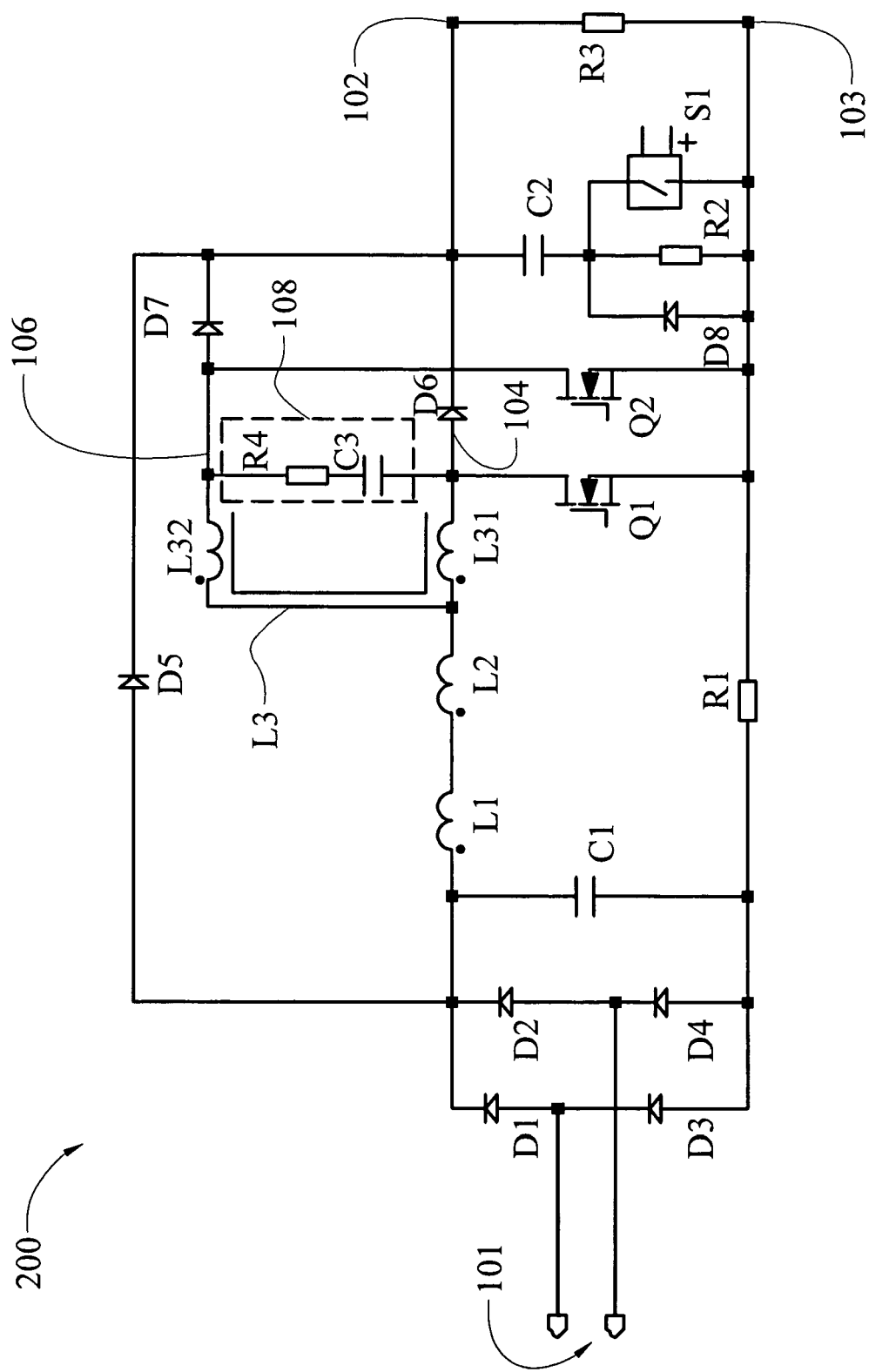
FIG. 4 is a circuit diagram of a boost converter having a current balancing circuit according to another embodiment of the present disclosure.
Figure 5:
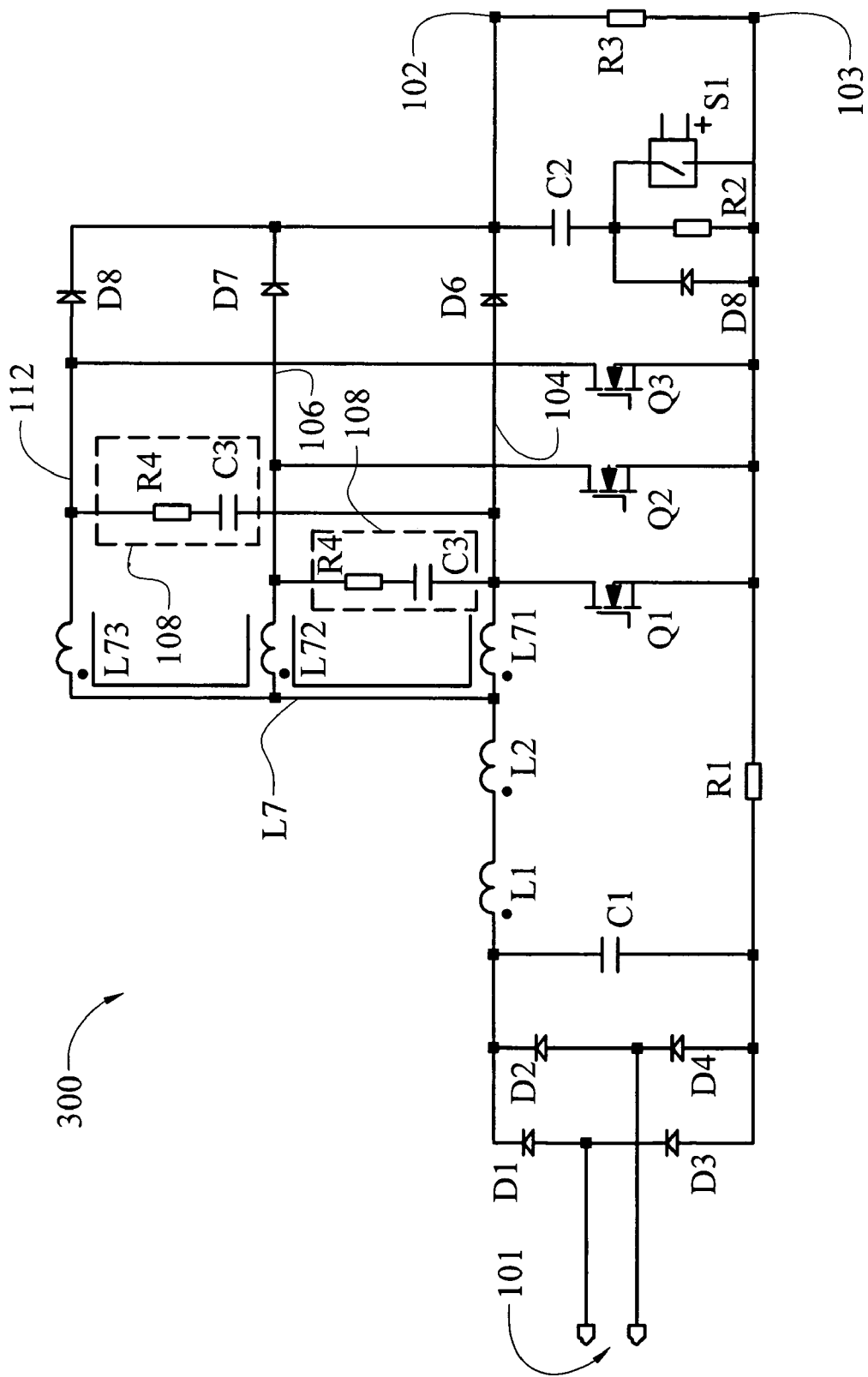
FIGS. 5 and 6 are circuit diagrams of boost converters having multiple current balancing circuits according to additional embodiments of the present disclosure.
Figure 6:
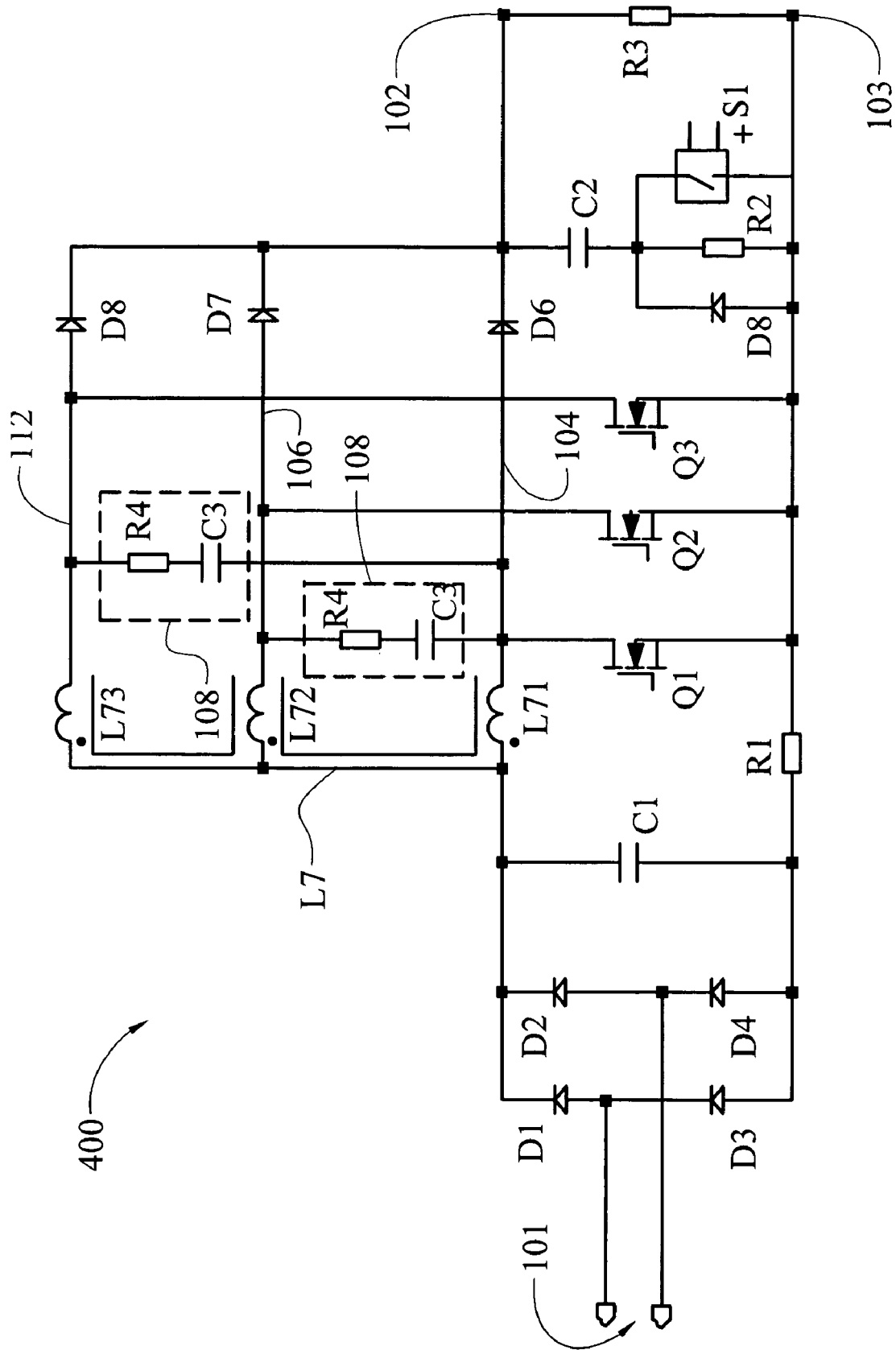

In some embodiments, as illustrated in FIGS. 4-6, the current balancing circuit 108 can include a resistor R4 in series with the capacitor C3. The resistance of the resistor R4 can be low, ranging from a few milliohms to a few ohms. In some embodiments, the resistor R4 shown in FIGS. 4-6 may represent the equivalent series resistance of the capacitor C3 (such that only the capacitor C3 is employed).

Although the boost converter 200 of FIG. 2 includes only two power rails 104 and 106, it should be understood that the present disclosure is not so limited. For example, current balancing circuits as described above can be applied to power converters having more than two power rails. For example, FIGS. 5 and 6 illustrate boost converters 300 and 400, respectively, which include a third power switch Q3, a third boost diode D8, and a split boost choke L7 including three (or more) coupled windings L71, L72 and L73. The boost diode D8 and the winding L73 form a third power rail 112 in addition to the power rails 104 and 106. The boost converters 300, 400 in FIGS. 5 and 6 each include two current balancing circuits 108. One current balancing circuit 108 is coupled between the power rails 104 and 106, and the other current balancing circuit 108 is coupled between the power rails 104 and 112.

Additionally, although FIGS. 2-5 illustrate boost chokes L1 and L2 in addition to the split boost choke L3 (or L7), it should be understood that more or less boost chokes can be employed. For example, in the boost converter 400 of FIG. 6, the split boost choke L7 is the only boost choke employed.

Although FIGS. 5-6 illustrate boost converters having three power rails 104, 106 and 112, it should be understood that more than three power rails can be employed without departing from the scope of this disclosure.

The current balancing circuits described herein can be employed in a variety of power factor correction (PFC) circuits including those having high power output requirements (e.g., greater than 1.5 kW). In addition to boost converters, such PFC circuits can also be employed in other converter types including, for example, buck converters.

Furthermore, although FIGS. 2-6 illustrate the power switches Q1 and Q2, and FIGS. 5-6 illustrate the power switch Q3, as metal-oxide semiconductor field effect transistors (MOSFETs), other suitable switches, including without limitation bipolar junction transistors (BJTs) and/or insulated-gate bipolar transistors (IGBTs), can be used without departing from the scope of this disclosure.

What is claimed is:

1. A power factor correction (PFC) circuit for a power converter, the PFC circuit comprising at least one output terminal, a split boost choke having at least two windings, at least two boost diodes, at least two power rails, each power rail connected to said output terminal and including one of said windings and one of said boost diodes, and a current balancing circuit coupled between the power rails.

2. The PFC circuit of claim 1 wherein the current balancing circuit comprises a capacitor.

3. The PFC circuit of claim 2 wherein the current balancing circuit further comprises a resistor connected in series with the capacitor.

4. The PFC circuit of claim 2 further comprising at least two power switches, each switch connected to one of the power rails for controlled biasing of the boost diodes.

5. The PFC circuit of claim 4 wherein the switches comprise MOSFETs.

6. The PFC circuit of claim 2 wherein the current balancing circuit is coupled between anodes of the boost diodes.

7. The PFC circuit of claim 2 wherein the split boost choke is a coupled split boost choke.

8. A power converter comprising the PFC circuit of claim 1.

9. A power converter comprising at least one output terminal, a coupled split choke having at least three windings, at least three diodes, at least three power rails, each power rail connected to said output terminal and including one of said windings and one of said diodes, and at least two current balancing circuits, each current balancing circuit coupled between two of said power rails for substantially balancing currents in the power rails when the power converter is delivering power to the output terminal.

10. The power converter of claim 9 wherein the at least three power rails include a first, a second and a third power rail, wherein one of the current balancing circuits is coupled between the first and second power rails, and the other current balancing circuit is coupled between the first and third power rails.

11. The power converter of claim 9 wherein each current balancing circuit comprises a capacitor.

12. The power converter of claim 9 wherein each current balancing circuit comprises a capacitor in series with a resistor.

13. A power converter comprising at least one output terminal, a split choke having at least two coupled windings, at least two diodes, and at least two power rails, each power rail connected to said output terminal and including one of said windings and one of said diodes, and a current balancing circuit coupled between the power rails.

14. The power converter of claim 13 wherein the current balancing circuit comprises a capacitor.

15. The power converter of claim 14 wherein the current balancing circuit further comprises a resistor connected in series with the capacitor.

16. The power converter of claim 14 further comprising at least two power switches, each switch connected to one of the power rails for controlled biasing of the diodes.

17. The power converter of claim 16 wherein the switches comprise MOSFETs.

18. The power converter of claim 14 wherein the current balancing circuit is coupled between anodes of the diodes.

19. The power converter of claim 14 wherein the power converter is a boost converter.

20. The power converter of claim 14 wherein the power converter is an AC-to-DC power converter.

21. The PFC circuit of claim 1 wherein the current balancing circuit consists of a capacitor.

22. The PFC circuit of claim 1 wherein the current balancing circuit consists of a resistor connected in series with a capacitor.

23. The power converter of claim 9 wherein each current balancing circuit consists of a capacitor.

24. The power converter of claim 9 wherein each current balancing circuit consists of a capacitor in series with a resistor.

25. The power converter of claim 13 wherein the current balancing circuit consists of a capacitor.

26. The power converter of claim 13 wherein the current balancing circuit consists of a resistor connected in series with a capacitor.

* * * * *

UNITED STATES PATENT AND TRADEMARK OFFICE
CERTIFICATE OF CORRECTION

PATENT NO. : 7,586,769 B2
APPLICATION NO. : 11/433836
DATED : September 8, 2009
INVENTOR(S) : Gaikwad et al.

It is certified that error appears in the above-identified patent and that said Letters Patent is hereby corrected as shown below:

On the Title page, at identifier Item (75) Inventors: replace "Madav" with -- Madhav --; and replace "Palanivel Selvaraju" with -- Selvaraju Palanivel --.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,586,769 B2  Page 1 of 1
APPLICATION NO. : 11/433836
DATED : September 8, 2009
INVENTOR(S) : Gaikwad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 211 days.

Signed and Sealed this

Twenty-first Day of September, 2010

David J. Kappos
*Director of the United States Patent and Trademark Office*